Patented Aug. 31, 1943

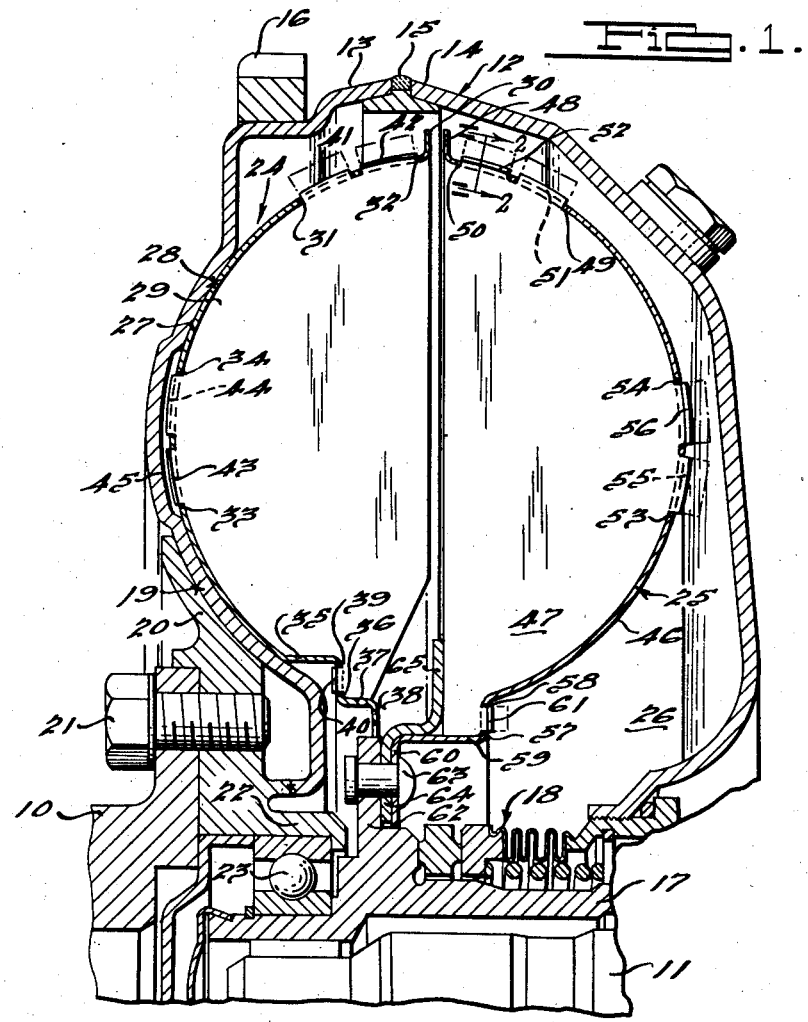

2,328,393

UNITED STATES PATENT OFFICE 2,328,393

FLUID COUPLING

Carl A. Neracher and William T. Dunn, Detroit, Mich., assignors to Chrysler Corporation, Highland Park, Mich., a corporation of Delaware Application February 13, 1941, Serial No. 378,738

5 Claims. (Cl. 60—54)

This invention relates to a fluid coupling of the kinetic type.

An object of the invention is to provide in a fluid coupling principally fabricated from a plurality of sheet metal stampings of improved means for securing the latter in assembled relationship, the stampings being fashioned and assembled in a novel manner for attaining the objects of the invention.

A coupling of the type herein contemplated includes impeller and runner structures each comprising a cover structure and a plurality of vanes which are mechanically connected together preferably by bending or deforming parts of the assembly into locking engagement with other parts thereof. More particularly, an object of the invention is the provision of means for locking the vanes to the carrier therefor, such means being preferably disposed without the fluid working chamber.

Another object of the invention is to provide a cover structure and vanes therefor which are so fashioned as to facilitate manufacture and assembly at relatively low cost and which will provide a coupling having improved strength and operating characteristics.

Other objects and advantages of the invention will be more apparent from the following description taken in connection with the accompanying drawing, in which:

Fig. 1 is a sectional elevational view through a coupling embodying the invention.

Fig. 2 is a fragmentary sectional view taken as indicated by the line 2—2 of Fig. 1.

Fig. 3 is a fragmentary sectional view illustrating a further form of impeller cover and vane arrangement.

The invention is illustrated and described in connection with a fluid coupling of the kinetic type having a toroidal circuit for the working liquid formed by juxtaposed annular vane impeller and runner structures, dished in cross section and opening one toward the other, these structures preferably being principally fabricated from sheet metal stampings. While the improved coupling is particularly adapted for establishing a drive between a driving part such as the crank shaft 10 of an internal combustion engine, and a driven part such as the shaft 11, it will be understood that couplings embodying the invention can be utilized in drives other than those for motor vehicles.

The coupling includes an annular casing 12 preferably of sheet metal and having separately formed walls 13 and 14, edge portions thereof being secured together as at 15. When employed as herein contemplated, the coupling functions as a fly wheel structure and is provided with a ring gear 16.

The casing wall 14 has a central opening therein through which extends a hub-forming sleeve 17 journalled on the driven shaft 11 and adapted to be operably connected thereto by a suitable clutch (not shown), although if desired the sleeve can be splined to the shaft 11. A sealing unit, generally designated by the numeral 18, cooperates with the hub 17 to seal the opening in the casing wall 14. The casing wall 13 is drivingly secured as by welding at 19 to a centrally apertured annulus 20 which, in turn, is secured by a plurality of bolts 21 or the like to a flange of the driving shaft 10. The hub-forming sleeve 17 is journalled in a flange 22 of the annulus 20 by a bearing unit 23.

Positioned within the casing 12 in juxtaposed relationship are the impeller and runner structures, generally indicated at 24 and 25 respectively cooperating to form a working chamber for the circulation of the fluid operating medium, each structure including a plurality of circumferentially spaced, radially extending vanes providing fluid passages. In addition to the working chamber there is also provided within the casing 12 an evacuating chamber 26 communicating with the working chamber.

The impeller structure includes an annular dish-shaped sheet metal vane carrier 27 secured to the casing wall 13 by welding, as indicated at 28, and having a plurality of circumferentially spaced radially extending vanes, one of which is indicated at 29, formed of sheet metal. The radially outer portion of the carrier 27 is flanged at 30 and adjacent the latter is a first series of circumferentially spaced pairs of slot-like openings, the slots 31 and 32 of one of such pairs registering with a vane 29. The carrier 27 is further provided with a second series of circumferentially spaced pairs of slot-like openings intermediate the radially inner and outer portions thereof, the slots 33 and 34 of one of such pairs registering with a vane 29. The radially inner portion of the carrier has an axial flange 35, an inwardly extending flange 36, a second axial flange 37 and a terminal flange 38 extending radially inwardly, the flange 36 having a plurality of circumferentially spaced slot-like openings 39 therein, respectively registering with a vane 29.

This arrangement provides a stepped portion and each vane 29 has the radially inner end thereof so shaped as to preferably seat on the flange 37, such end portion being provided with a tab 40 extending from an edge thereof through the registering slot 39 and angularly deflected to effect an interlock with the flange 36 forming the riser in the stepped portion.

Each vane 29 is provided with a pair of tabs 41 and 42 at the radially outer portion thereof which respectively register with and extend through the slots 31 and 32 of one pair of the first series, the tabs 41 and 42 being oppositely deflected to effect an interlock between the vane and carrier. Each vane 29 has a second pair of tabs 43 and 44 which respectively register with and extend through the slots 33 and 34 of one pair of the second series, the tabs 43 and 44 being oppositely deflected to effect an interlock as aforesaid. The casing wall 13 is provided with an annular recess, indicated at 45, receiving the deflected portion of the tabs 43 and 44.

The runner structure 25 includes an annular dish-shaped sheet metal vane carrier 46 and a plurality of circumferentially spaced radially extending vanes, one of which is indicated at 47, formed of sheet metal. The carrier 46 has a flange 48 at the radially outer edge thereof, adjacent which is a series of circumferentially spaced pairs of slot-like openings, the slots 49 and 50 of one of such pair respectively registering with tabs 51 and 52 of a vane 47, these tabs extending through the registering slots and being oppositely deflected to effect an interlock with the carrier.

The carrier 46 is provided with a second series of circumferentially spaced pairs of slot-like openings, the slots 53 and 54 of one of such pairs respectively registering with tabs 55 and 56 of a vane 47, these tabs extending through the registering slots and being oppositely deflected to effect an interlock as aforesaid.

The carrier 46 has a radially inwardly extending flange 57 provided with a plurality of circumferentially spaced slot-like openings, one of which is shown at 58, which respectively register with one of the vanes 47; an axially extending flange 59; and a radial attaching flange 60. Each vane 47 has the radially inner end portion thereof so shaped as to preferably seat on the flange 59 and is provided with a tab 61 extending through a registering slot 58 and deflected to engage with the flange 57.

The hub forming sleeve 17 has an annular flange 62 to which is drivingly secured by rivets 63 the flange 60 of the runner carrier 46 and an annular member 64, the latter being deflected axially so that a part 65 thereof extends into the coupling working chamber to overlie the radially inner portion of the fluid passages provided by the vanes 47 and impede high fluid circulation velocity of the fluid operating medium to thereby facilitate relatively high slip condition between the impeller and runner structure.

The part 65 preferably abuts the adjacent edge of the vanes 47 and cooperates with the flange 57 of the vane carrier 46 to form an annular channel in which is received the radially inner end portion of the vanes 47.

While it is intended that the foregoing arrangement should be sufficient to securely fix the vanes to the carrier therefor, nevertheless it will be understood that if desired the arrangement can be supplemented by welding the vanes to the carrier utilizing for example the copper-hydrogen method.

Referring to Fig. 3, the parts and the arrangement thereof are the same as in Fig. 1 except that the carrier 27 of the impeller structure 24 is provided with an annular channel receiving the adjacent end portion of the vanes 29 and providing a seat therefor, the arrangement being similar to that provided for the inner end portions of the runner vanes 47. The channel is formed by deflecting the flange 38' toward the vanes 29 so as to overlie and abut an edge thereof.

We claim:

1. A fluid coupling of the kinetic type including juxtaposed impeller and runner structures, at least one of said structures including an annular sheet metal vane carrier having a dished section and a radially inner end portion including a terminal flange disposed radially with respect to the axis of rotation of the coupling, a second flange disposed parallel to said axis and a third flange disposed radially with respect to said axis and having circumferentially spaced slots therein, said carrier having a first series of circumferentially spaced pairs of slots in the radially outer portion thereof and a second series of circumferentially spaced pairs of slots intermediate said first series and said inner end portion, a plurality of circumferentially spaced radially extending fluid passage forming vanes seated in said dished section, each of said vanes having a first pair of tabs respectively extending through a pair of the slots of said first series and oppositely deflected to interlock with said carrier and a second pair of tabs respectively extending through a pair of the slots of said second series and oppositely deflected to interlock with said carrier, each of said vanes having a radial extremity abutting said second flange and having a tab extending parallel to said axis through a slot of said third flange and deflected to interlock therewith.

2. A fluid coupling of the kinetic type including juxtaposed vaned impeller and runner structures, cooperating to form a fluid working chamber, said runner structure including a sheet metal vane carrier having a dish-shaped section and a stepped portion having a riser provided with a plurality of circumferentially spaced openings, an annular member rotatable with said carrier extending into said chamber and spaced axially from said riser, a plurality of circumferentially spaced radially extending fluid passage forming vanes seated in said dish-shaped section each having spaced pairs of tabs, said carrier having spaced pairs of slots respectively receiving the spaced pairs of tabs of said vanes, the tabs of each of said pairs being oppositely deflected to engage the surface of said carrier exterior to said chamber, each of said vanes having an end portion thereof extending between said member and said riser, and a tab projecting from an edge portion of each of said vane end portions through a slot in said riser and interlocked therewith, said member engaging the opposite edge portion of said end portion of said vanes.

3. A fluid coupling of the kinetic type including juxtaposed vaned impeller and runner structures cooperating to form a fluid working chamber, at least one of said structures including a sheet metal vane carrier, means secured to said carrier and cooperating therewith to form an annular channel adjacent the inner portion of said carrier, a wall of said channel having a series of circumferentially spaced slots therein, a plurality of circumferentially spaced radially extending vanes forming fluid passages for said one structure, each of said vanes extending into said channel and having a tab extending into one of said slots and deflected to secure the tab to said wall, each of said vanes having further adjacently disposed tabs and said carrier having further adjacently disposed slots respectively receiving said tabs, said adjacently disposed tabs being oppositely deflected to effect an interlock between the vane and carrier.

4. A fluid coupling of the kinetic type including juxtaposed vaned impeller and runner structures cooperating to form a fluid working chamber, said impeller structure including a sheet metal vane carrier having radially spaced edge portions and an intermediate dish-shaped section, the radially innermost of said edge portions being deflected to form an annular channel, a plurality of circumferentially spaced radially extending vanes forming fluid passages for said impeller structure, a plurality of said vanes having the radially inner end portions thereof extending into said channel, means interlocking said end portions with a wall of said channel, each of said vanes having tabs disposed at relatively different distances from the axis of rotation of said coupling and said carrier having slots in said dish-shaped section respectively receiving said tabs whereby said vanes are interlocked with said carrier.

5. In a fabricated fluid coupling of the kinetic type including juxtaposed impeller and runner structures cooperating to form a fluid working chamber, said runner structure including an annular sheet metal vane carrier having a dished section provided with a plurality of slots adjacent to and spaced from the radially outer edge portion thereof, said carrier having a mounting flange at the radially inner edge portion thereof and a generally radially extending annular flange intermediate the dished section and the mounting flange provided with circumferentially spaced slots each so formed as to receive a tab extending generally parallel to the rotative axis of the coupling, and a plurality of circumferentially spaced radially extending fluid passage forming sheet metal vanes seated in said dished section, each of said vanes having a tab at the outer end portion thereof passing through one of the first mentioned slots and interlocked with the carrier, the inner end portion of each of said vanes overlapping said radial flange and carrying a tab extending generally parallel to said axis through one of the second mentioned slots and interlocked with the carrier.

CARL A. NERACHER.
WILLIAM T. DUNN.